May 15, 1962

H. FISCHER 3,035,220

DIRECT-VOLTAGE STEP-UP TRANSFORMER DEVICE
OF THE STATIC TYPE FOR LOW-POWER OUTPUT

Filed May 28, 1959

United States Patent Office
3,035,220
Patented May 15, 1962

3,035,220
DIRECT-VOLTAGE STEP-UP TRANSFORMER DEVICE OF THE STATIC TYPE FOR LOW-POWER OUTPUT
Hans Fischer, Bulach, Zurich, Switzerland, assignor to Albiswerk Zurich A.G., Zurich, Switzerland, a corporation of Switzerland
Filed May 28, 1959, Ser. No. 816,628
Claims priority, application Switzerland May 31, 1958
12 Claims. (Cl. 321—2)

My invention relates to a direct-voltage step-up device for less than 1 watt power output.

Such low-power devices, serving to translate low direct voltage into a much higher direct voltage, are provided with a semiconductor oscillator, preferably a transistor, cooperating with a high-voltage transformer and a rectifier connected in the secondary circuit of the transformer. Devices of this type serve mainly for feeding portable electronic devices from batteries of low voltage, for example 12 volts and less, by converting the battery voltage into the higher plate voltages required for the electronic tubes. The conversion takes place in three stages. First the low input voltage is converted by the oscillator to an alternating voltage, particularly an impulse or square-wave voltage. Then the alternating voltage is transformed to a higher amplitude by means of the transformer. Subsequently, the increased alternating voltage is rectified to obtain the desired high direct output voltage. For a more detailed description of the design and operation of such direct-current transforming devices, reference may be had to the series of articles entitled "The Design and Operation of Transistor D.C. Converters" in the periodical "Mullard Technical Communications" 2 (1956), 17.

It is known to employ such direct-voltage transforming devices for producing very high direct voltages as required, for example, for the operation of cathode ray tubes, picture tubes, counting tubes and the like. As a rule, the power demand of such high-voltage devices is very low, often far below 1 watt. However, the power losses in the known direct-voltage transforming device of this type, when supplying a slight power output, is relatively high, resulting in poor efficiency and uneconomical performance.

It is an object of my invention to eliminate this disadvantage and to devise a direct-voltage transformer device operating with transistors or similar solid-state components, that furnishes a low power output of not more than 1 watt at greatly increased efficiency and economy.

Figure 1:
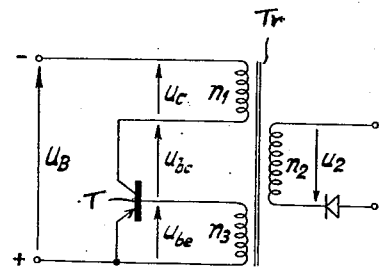

The invention will be further described with reference to the drawings, in which:

FIG. 1 is explanatory and shows a schematic circuit diagram of a direct-voltage transformer device according to prior art; and FIGS. 2, 3, 4 and 5 are circuit diagrams of four different embodiments of an improved direct-voltage transforming device according to the invention.

The above-mentioned inefficiency of the known direct-voltage transforming devices will be understood from the following consideration relating to FIG. 1 and limited to no-load operation because the occurring load currents, in the order of 10 microamps for example, do not practically change the situation. Voltage losses are neglected.

The desired secondary peak voltage $\hat{u}_2$ is predicated upon a given magnetic-field change in the core of the high-voltage transformer Tr. The magnetic flux for producing the required magnetic field is determined by the product of the collector current peak $\hat{i}_c$ in the conducting condition of the transistor T and the turn number of the winding $n_1$, the terms $n_1$, $n_2$, and $n_3$ being used hereinafter for identifying respective numbers of turns as well as the corresponding windings of the transformer Tr. Winding $n_1$ is the primary winding, winding $n_2$ the secondary winding, and winding $n_3$ a secondary feedback winding. The number of turns for winding $n_1$ is preferably chosen as high as feasible in order to keep the required collector current at a low value. The collector current, on the other hand, is independent of the feed voltage $U_B$ so that it may appear that this voltage can be given any desired low value. However, such reduction of feed voltage and current for the purpose of minimizing the power input, is limited by the following facts which prevent obtaining a high efficiency.

The transistor in conducting condition requires a given basis-emitter voltage $u_{be}$, for example 1 volt, in order to attain the correct collector current $i_c$ required for producing the magnetic field. Assuming that the feed voltage is likewise 1 volt, the transformation ratio must be $n_1/n_3=1$, because in the conducting condition of the transistor substantially the entire feed voltage is impressed across winding $n_1$ in the collector circuit. Assume further that, during the blocking phase of the transistor, there occur an induction voltage, for example $u_c=100$ volts, across the collector winding $n_1$. Consequently, since $n_1/n_3=1$, the base-emitter voltage is likewise $u_{be}=100$ volts. This corresponds to a base-emitter forward voltage of $u_{be}=-199$ volts. The base collector voltage for each given transistor must not exceed a given limit value. Starting from this given limit value, the voltage $u_c$ at the collector winding $n_1$ should not be 50% as in the preceding numerical example, but should come as close as possible to 100% of the given limit voltage, in order to permit giving $n_1$ the relatively great number of turns for the reasons explained above. On the other hand, the base-emitter voltage need only be as large as required for initiating the blocking phase, for example only 5 volts.

If one increased the feed voltage, for example to 10 volts, thus establishing a transformation ratio $n_1/n_3=10$ for an unchanged number of turns $n_1$, there would result a base-emitter voltage $u_{be}=10$ volts and a base-collector voltage $u_{ce}=110$ volts during the blocking phase of the transistor. The above-mentioned ratio would thus be improved from 50% up to approximately 90%, but 10 times the previous amount of power supply would be required.

According to the present invention, the above-mentioned disadvantages are eliminated by providing the oscillator two feed-back circuits or circuit branches of which the first one is active during the conducting phase and the second during the blocking phase of the transistor or other controllable semiconductor device, a solid-state diode being inserted into the first-mentioned feed-back circuit.

It will be shown in the following with reference to the circuit diagrams of FIGS. 2 to 4 that in this manner the low feed voltage, for example of 1 volt, desired for obtaining a low feed-in power, can be maintained while nevertheless attaining a transformation ratio of $u_e/u_{be}$ of nearly 100%.

Figure 2:
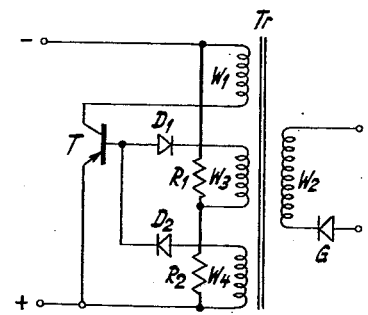

The direct-current transforming device according to FIG. 2 comprises an oscillator with a transistor T in emitter connection, a high-voltage transformer Tr with a primary winding $W_1$ and three secondary windings $W_2$, $W_3$, $W_4$, a rectifier G being connected with the secondary winding $W_2$. While the rectifier G is shown to consist of a diode, preferably of the solid-state type, a full-wave rectifier may be used for furnishing the desired high output direct voltage.

The oscillator comprises two feedback paths which extend between the base of the transistor T and the emitter. The two feedback connections include respective diodes $D_1$ and $D_2$, for example germanium diodes. The feedback path comprising the diode $D_1$ is active during the conducting phase, and the feedback path with the oppositely poled diode $D_2$ is active during the blocking phase of the transistor. The two feedback voltages are taken from separate windings $W_3$ and $W_4$ respectively of the high-voltage transformer $Tr$ and hence can be chosen independently of each other. Resistors $R_1$ and $R_2$ are inserted to permit adjusting most favorable operating conditions. With very low feed voltages the resistor $R_2$ may be omitted.

As far as the conducting phase of transistor T is concerned, the performance of the oscillator in the system of FIG. 2 is virtually the same as in the known device according to FIG. 1; but a fundamental difference exists with respect to the performance during the blocking phase. For comparison reference will be made to the above-mentioned numerical example including a feed voltage $U_g=1$ volt. The induction voltage of 100 volts occurring across winding $W_3$ during the blocking phase of transistor T, now has virtually no effect upon the base circuit of the transistor due to the blocking action of the diode $D_1$, the base circuit being now controlled by the induction voltage taken from winding $W_4$ through diode $D_2$. This induction voltage can be kept at a low value, for example 5 volts, by the choice of a suitable number of winding turns for winding $W_4$. This results in a base-collector voltage of approximately 105 volts and a ratio $u_e/u_{be}$ of approximately 95%.

Figure 3:
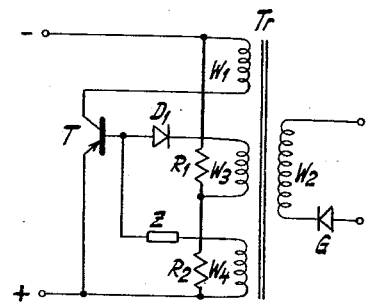

The embodiment of FIG. 3 differs from that of FIG. 2 only in that the diode $D_2$ in the feedback branch active during the blocking phase of transistor T, is substituted by an impedance Z of any desired type, for example an ohmic resistor or capacitor. This impedance Z must be so dimensioned that it does not form an appreciable shunt relative to the transistor-base impedance during the conducting phase of the transistor.

Figure 4:
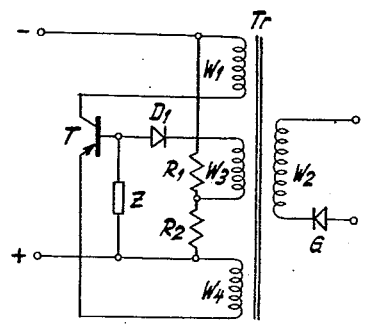

The embodiment shown in FIG. 4 is further modified in having only the first feedback path connected to the base of the transistor, whereas the second feedback path leads to the emitter of transistor T. In this case the impedance Z, consisting of a diode, resistor or capacitor, determines the magnitude of the feedback voltage which is to be active during the blocking phase of the transistor T.

Figure 5:
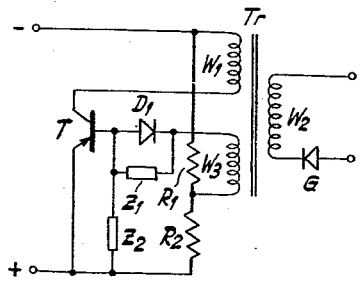

In the embodiment of FIG. 5, the two feedback voltages are taken from a common winding $W_3$ of the high-voltage transformer $Tr$. In this case, the impedance $Z_1$, connected in parallel to the diode $D_1$, constitutes a second feedback path. In order to reliably avoid the occurrence of extreme voltage peaks at the base of the transistor T, a protective impedance $Z_2$, preferably a voltage-dependent resistor, is provided.

While the invention is described above with reference to a transistor oscillator, it will be obvious to those skilled in the art that the transistor may be substituted by an equivalent controllable semiconductor rectifier device such as a controllable junction-type rectifier.

I claim:

1. A direct-voltage step-up transformer device, particularly for a power output below 1 watt, comprising low direct-voltage input leads, a transformer having a low-voltage primary and a high-voltage secondary and secondary feedback winding means, a controllable semiconductor device forming an oscillator together with said primary and being connected between said input leads, said semiconductor device having a control circuit comprising two parallel branches connected with said feedback winding means, each branch having a feedback effect different in magnitude from the other, a diode serially connected in the one of said branches having the greater effective feedback magnitude and poled to render said branch active for feedback control of said oscillation only in the conducting phase of said semiconductor device, said other branch being active during the blocking phase, and an output circuit having a rectifier connected with said secondary to provide stepped-up direct voltage.

2. A direct-voltage step-up transformer device, comprising low direct-voltage input leads, a transformer having a low-voltage primary and a high-voltage secondary and two secondary feedback winding means, a transistor having an emitter-collector circuit connected in series with said primary between said input leads to form an oscillator together with said primary, two parallel feedback control circuits each connecting said transistor with a different one of said feedback winding means, each branch having a feedback effect different in magnitude from the other, a diode serially connected in the one of said feedback circuits having the greater effective feedback magnitude and poled to render said one feedback circuit active only during the conducting phase of said transistor, said other feedback circuit being active during the blocking phase, and an output circuit having a rectifier connected with said secondary to provide stepped-up direct voltage.

3. A direct-voltage step-up transformer device, particularly for a power output below 1 watt, comprising low direct-voltage input leads, a transformer having a low-voltage primary and a high-voltage secondary and two secondary feedback winding means, a controllable semiconductor device forming an oscillator together with said primary and being connected between said input leads, said semiconductor device having a control circuit comprising two parallel branches each connected with a different one of said feedback winding means, each branch having a feedback effect different in magnitude from the other, two solid-state diodes serially connected in said respective two branches and opposingly poled relative to each other to render the one of said branches having the greater effective feedback magnitude active for feedback control of said oscillation only in the conducting phase of said semiconductor device and said other branch only during the blocking phase, and an output circuit having a rectifier connected with said secondary to provide stepped-up direct voltage.

4. A direct-voltage step-up transformer device, comprising low direct-voltage input leads, a transformer having a low-voltage primary and a high voltage secondary and two secondary feedback winding means, a transistor having an emitter-collector circuit connected in series with said primary between said input leads to form an oscillator together with said primary, two parallel feedback control circuits each connecting said transistor with a different one of said feedback winding means, each branch having a feedback effect different in magnitude from the other, two solid-state diodes serially connected in said respective two circuits and opposingly poled relative to each other to render the one of said circuits having the greater effective feedback magnitude active for feedback control of said oscillation only in the conducting phase of said semiconductor device and said other circuit only during the blocking phase, and an output circuit having a rectifier connected with said secondary to provide stepped-up direct voltage.

5. A direct-voltage transformer device according to claim 2, comprising an impedance member connected in said other feedback circuit.

6. In a direct-voltage transformer device according to claim 2, said two feedback control circuits being connected to the base of said transistor in parallel relation to each other.

7. In a direct-voltage transformer device according to claim 2, said one feedback circuit being connected to the base of said transistor, and said other feedback circuit being connected to the emitter of said transistor.

8. In a direct-voltage transformer device according to claim 1, said secondary feedback winding means of said transformer comprising two windings having respectively different numbers of turns, and said two parallel branches being connected to said respective two latter windings to be impressed by respectively different voltages.

9. In a direct-voltage transformer device according to claim 2, said secondary feedback winding means of said transformer each comprising a winding having respectively different numbers of turns from the other winding, and said two circuits being connected to said respective two latter windings to be impressed by respectively different voltages.

10. In a direct-voltage transformer device according to claim 1, said secondary feedback winding means of said transformer having a single winding to which both said circuit branches are connected.

11. An oscillator device for stepping-up of direct voltages, comprising low direct-voltage input leads, a transformer having a low voltage primary and a high voltage secondary and two secondary feedback windings with respectively different numbers of turns, a controllable semiconductor device forming an oscillator together with said primary and being connected between said input leads, said semiconductor device having a control circuit comprising two parallel branches each connected with one of said feedback winding means, a diode serially connected with the one of said branches connected to the feedback winding having the greater number of turns and poled to render said branch active for a feedback control of said oscillation only in the conducting phase of said semiconductor device, said other branch being active during the blocking phase, and rectifier means connected with said secondary to provide stepped-up direct voltage.

12. An oscillator device for stepping-up of direct voltages, comprising low direct-voltage input leads, a transformer having a low voltage primary and a high voltage secondary, a controllable semiconductor device forming an oscillator together with said primary and being connected between said input leads, two alternating current feedback coupling means of different feedback magnitudes inductively linked with said transformer and connected with said semiconductor device in parallel relation with each other each for passing only alternating current to said input leads, a diode serially connected in the one of said coupling means having the greater effective feedback magnitude and poled to render said coupling means active for a feedback control of said oscillator only in the conducting phase of said semiconductor device, said other coupling means being active during the blocking phase, and an output circuit having a rectifier connected with said secondary to provide stepped-up direct voltage.

References Cited in the file of this patent

UNITED STATES PATENTS

| | | |
|---|---|---|
| 2,846,581 | Volkers | Aug. 5, 1958 |
| 2,848,613 | Green et al. | Aug. 19, 1958 |
| 2,890,403 | Van Abbe | June 9, 1959 |